United States Patent
Choi et al.

(10) Patent No.: US 7,414,697 B1
(45) Date of Patent: Aug. 19, 2008

(54) LIQUID CRYSTAL DISPLAY WITH PARTICULAR GATE DUMMY PATTERNS TO FACILITATE REPAIR

(75) Inventors: Woo Hyuk Choi, Kyoungsangbuk-do (KR); Dong Yeung Kwak, Taegu-shi (KR); Byoung Ho Lim, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 35 days.

(21) Appl. No.: 09/677,870

(22) Filed: Oct. 3, 2000

(30) Foreign Application Priority Data

Oct. 4, 1999 (KR) .............................. 1999-42651

(51) Int. Cl.
*G02F 1/13* (2006.01)
(52) U.S. Cl. ..................................... 349/192
(58) Field of Classification Search ................ 349/38, 349/39, 44, 46, 54
See application file for complete search history.

(56) References Cited

U.S. PATENT DOCUMENTS

| | | | |
|---|---|---|---|
| 5,285,301 A | 2/1994 | Shirahashi et al. ............ 359/59 |
| 5,657,101 A * | 8/1997 | Cheng ........................... 349/42 |
| 5,734,450 A * | 3/1998 | Irie et al. ....................... 349/39 |
| 5,822,027 A * | 10/1998 | Shimada et al. ............... 349/39 |
| 5,943,106 A * | 8/1999 | Sukenori et al. .............. 349/39 |
| 5,956,103 A * | 9/1999 | Ishiguro ....................... 349/38 |
| 6,313,889 B1 * | 11/2001 | Song et al. .................... 349/54 |
| 6,429,909 B1 * | 8/2002 | Kim et al. ..................... 349/54 |
| 6,587,162 B1 * | 7/2003 | Kaneko et al. ................ 349/43 |
| 2002/0047977 A1 * | 4/2002 | Lee .............................. 349/141 |
| 2002/0145602 A1 * | 10/2002 | Matsueda .................... 345/213 |

FOREIGN PATENT DOCUMENTS

KR 1996-18695 6/1996

* cited by examiner

*Primary Examiner*—Timothy Rude
(74) *Attorney, Agent, or Firm*—Birch, Stewart, Kolasch & Birch, LLP

(57) ABSTRACT

A liquid crystal display has a gate line structure for serving as a storage electrode and a black matrix and performing a repair function. In the liquid crystal display, a gate dummy pattern is formed in such a manner to be extended in the vertical direction from the gate line and to overlap with the data line and the pixel electrode. The gate dummy pattern branches from the gate line, overlaps the edge of a pixel, serves a storage electrode and a black matrix, and permits repair upon breakage of a data line.

12 Claims, 6 Drawing Sheets

LIQUID CRYSTAL DISPLAY WITH PARTICULAR GATE DUMMY PATTERNS TO FACILITATE REPAIR

BACKGROUND OF THE INVENTION

1. Field of the Invention

This invention relates to a liquid crystal display, and more particularly to a liquid crystal display with a gate line structure that can serve as a storage electrode and a black matrix and perform a repair function.

2. Description of the Related Art

Generally, a liquid crystal display (LCD) controls a light transmissivity using an electric field to display a picture. To this end, the LCD includes a liquid crystal panel having liquid crystal cells arranged in a matrix type, and a driving circuit for driving the liquid crystal panel. The liquid crystal panel is provided with pixel electrodes for applying an electric field to each liquid crystal cell, and a reference electrode, that is, a common electrode. Typically, the pixel electrodes are provided on a lower substrate for each liquid crystal cell, whereas the common electrode is integrally formed on the entire surface of an upper substrate. Each of the pixel electrodes is connected, via source and drain terminals of a thin film transistor (TFT) used as a switching device, to any one of data lines. A gate terminal of each TFT is connected to any one of gate lines for applying a pixel voltage signal to pixel electrodes for one line.

FIG. 1 shows a thin film transistor substrate for a conventional liquid crystal display (LCD). The LCD includes thin film transistors 6 positioned at intersections between data lines 2 and gate lines 4, and pixel electrodes 14 connected to drain electrodes 12 of the thin film transistors 6. The thin film transistor 6 is provided at an intersection between the data line 2 and the gate line 4. The thin film transistor 6 has a gate electrode 10 connected to the gate line 4, a source electrode 8 connected to the data line 2, and a drain electrode 12 connected, via a first contact hole 16, to the pixel electrode 14.

The thin film transistor 6 further includes a semiconductor layer (not shown) for providing a conductive channel between the source electrode 8 and the drain electrode 12 by a gate voltage applied to the gate electrode 10. The thin film transistor 6 responds to a gate signal from the gate line 4 to selectively apply a data signal from the data line 2 to the pixel electrode 14. The pixel electrode 14 is positioned at a cell area divided by the data line 2 and the gate line 4, and is made from an indium tin oxide (ITO) material having high light-transmissivity. The pixel electrode 14 generates a potential difference from a common transparent electrode (not shown) provided at an upper glass substrate by a data signal applied via the first contact hole 16. By virtue of this potential difference, a liquid crystal positioned between the thin film transistor substrate and the upper substrate is rotated according to its dielectric anisotropic property and a light applied, via the pixel electrode 14, from a light source is transmitted into the upper glass substrate.

A storage capacitor 18 provided between the pixel electrode 14 and the gate line 4 at the previous stage plays a role in preventing voltage variation in the pixel electrode 14 by charging a voltage in a period at which a gate high voltage is applied to the previous-stage gate line 4 and discharging the charged voltage in a period at which a data signal is applied to the pixel electrode 14. Since, as stated, the storage capacitor 18 aims at maintaining a stable pixel voltage, it must have a high capacitance value. To this end, the storage capacitor 18 has a structure as shown in FIG. 2.

In FIG. 2, the storage capacitor 18 is defined by a storage electrode 20 electrically connected, via a second contact hole 22 formed in a protective film 28, to the pixel electrode 14 and a gate electrode 4 having on a gate insulating layer 26 therebetween. The storage electrode 20 is formed on the gate insulating layer 26 upon formation of the data line 2 and the source/drain electrodes 8 and 12. As a liquid crystal panel goes into a larger dimension, the capacitance value of the storage capacitor 18 must be increased. However, the above-mentioned LCD structure is limited in its ability to enlarge the capacitance of the storage capacitor 18.

The protective film 28 of the thin film transistor substrate is usually made from an inorganic material having a dielectric constant such $SiN_x$ or $SiO_x$. The pixel electrode 14 and the data line 2 having such an inorganic protective film therebetween maintain a certain horizontal distance d (e.g., 3 to 5 μm), as shown in FIG. 3, so as to minimize any coupling effect caused by a parasitic capacitor. In this case, in order to shut off light leaking through the space between the data line 2 and the pixel electrode 14, a black matrix formed on the upper substrate has a width sufficient to cover a portion of the pixel electrode 14 positioned at each side of the data line 2. As a result, the aperture ratio of the liquid crystal cell is inevitably reduced.

SUMMARY OF THE INVENTION

Accordingly, it is an object of the present invention to provide a liquid crystal display that is capable of enlarging a capacitance value of a storage capacitor.

A further object of the present invention is to provide a liquid crystal display that is capable of reducing the width of a black matrix to increase an aperture ratio, as well as to allow for repairs upon breakage of a data line.

In order to achieve these and other objects of the invention, a thin film transistor substrate in a liquid crystal display according to the present invention includes a gate dummy pattern formed so as to extend vertically from the gate line and to overlap with the data line and the pixel electrode.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
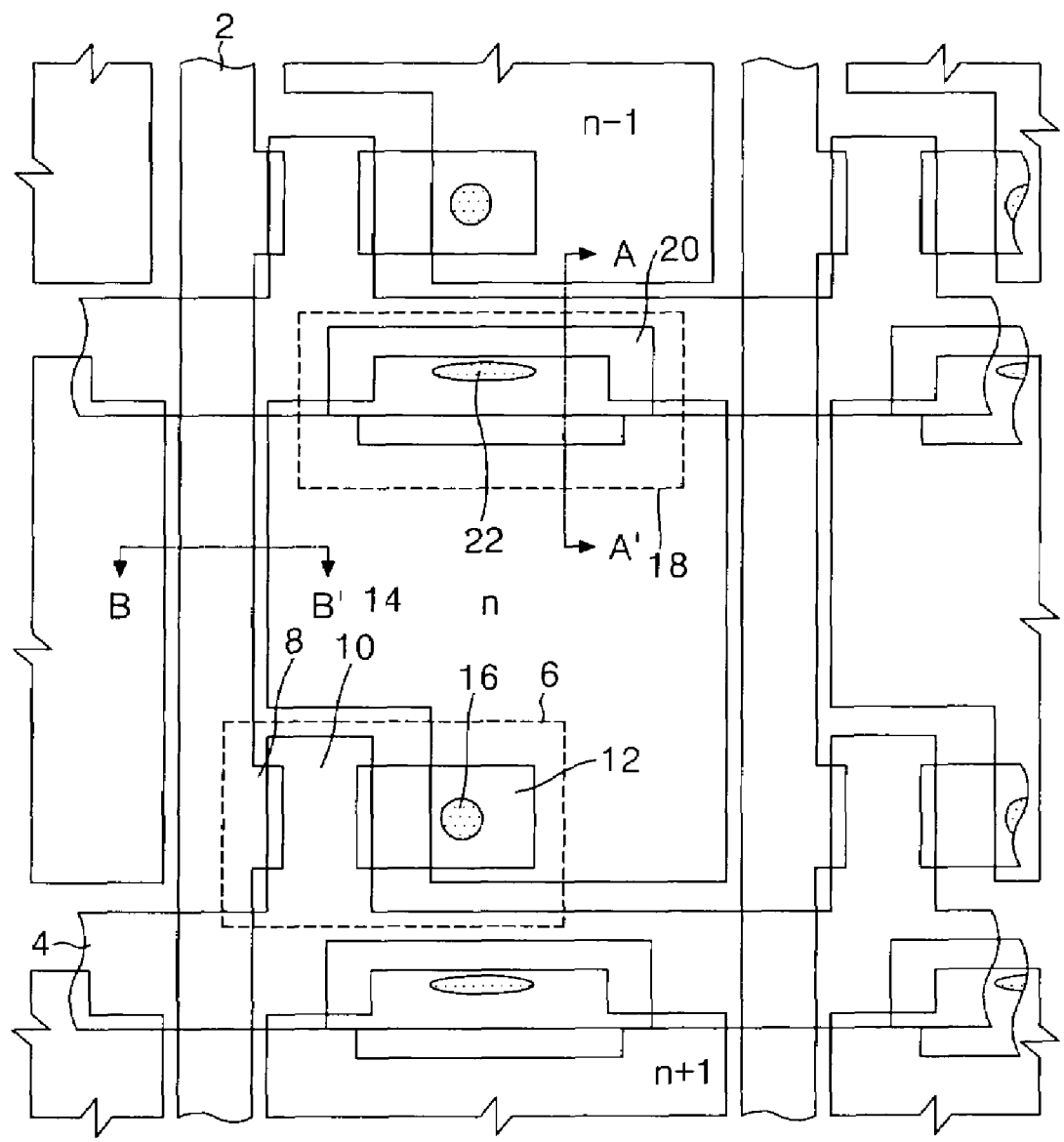
FIG. 1 is a plan view showing a structure of a thin film transistor substrate in a conventional liquid crystal display.
Figure 2:
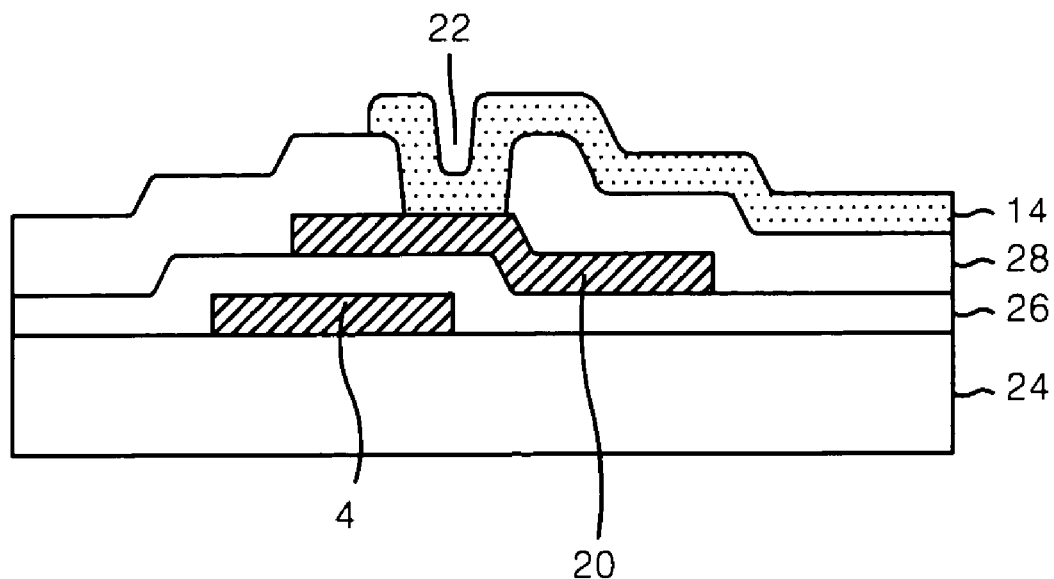
FIG. 2 is a sectional view of a portion of the storage capacitor taken along line A-A' in FIG. 1.
Figure 3:
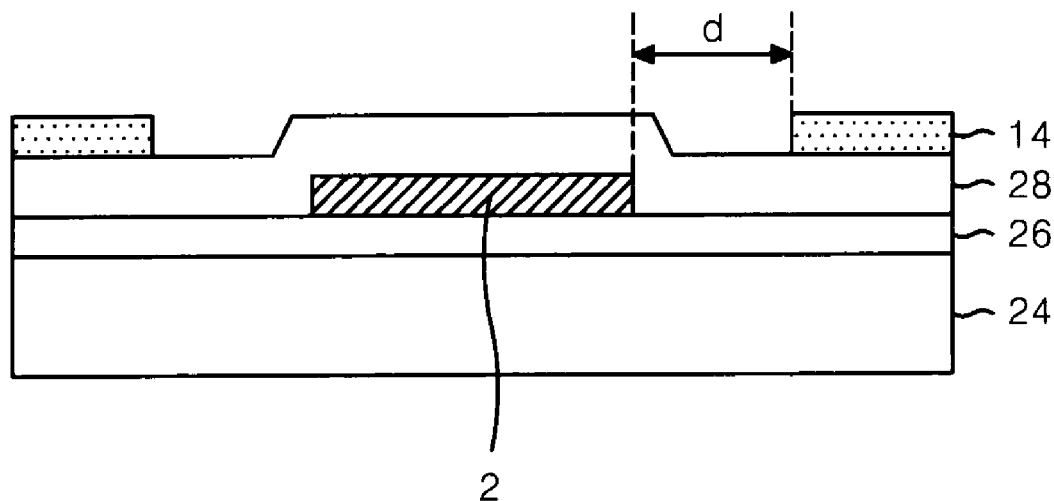
FIG. 3 is a sectional view of a portion of the data line taken along line B-B' in FIG. 1.
Figure 4:
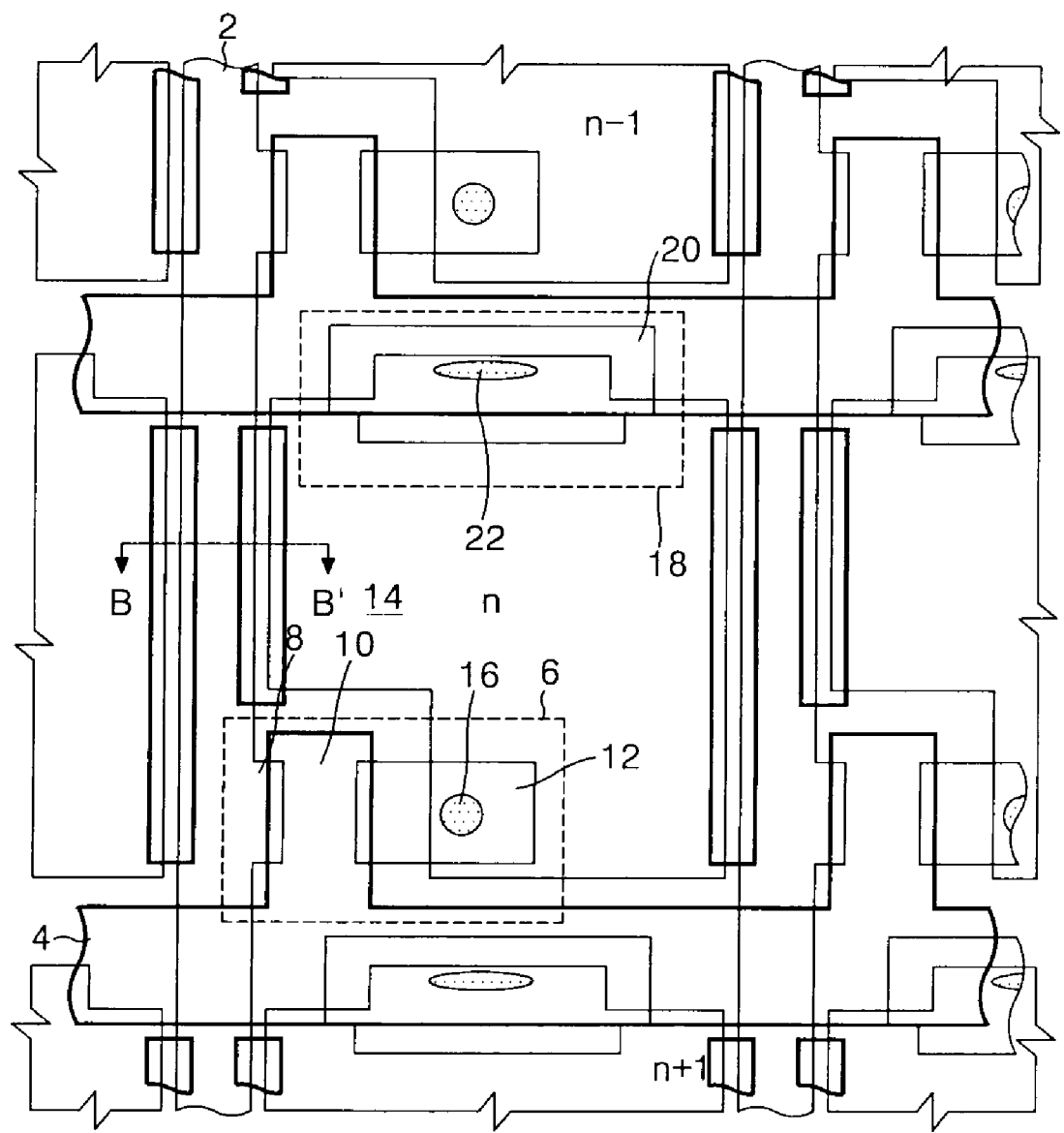
FIG. 4 is a plan view showing a structure of a thin film transistor substrate according to a first embodiment of the present invention.
Figure 5:
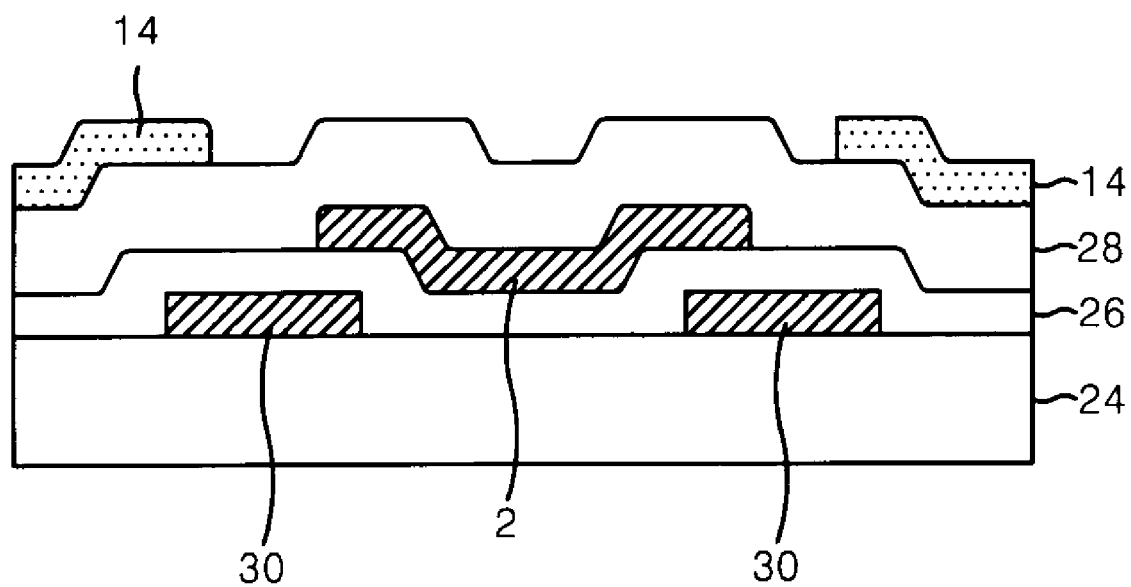
FIG. 5 is a sectional view of a portion of the data line taken along line A-A' line in FIG. 4.

Referring to FIG. 4, there is shown a thin film transistor substrate in a liquid crystal display (LCD) according to a first embodiment of the present invention. The LCD includes thin film transistors 6 positioned at intersections between data lines 2 and gate lines 4, pixel electrodes 14 connected to drain electrodes 12 of the thin film transistors 6, and gate dummy patterns 30 overlapping with the data lines 2 and the pixel electrodes 14 adjacent to the data lines 2. The thin film transistor 6 has a gate electrode 10 connected to the gate line 4, a source electrode 8 connected to the data line 2, a drain electrode 12 connected, via a first contact hole 16, to the pixel electrode 14, and a semiconductor layer (not shown) for providing a conductive channel between the source electrode 8 and the drain electrode 12 by virtue of a gate voltage applied to the gate electrode 10. Such a thin film transistor 6 responds to a gate signal from the gate line 4 to selectively apply a data signal from the data line 2 to the pixel electrode 14. The pixel electrode 14 generates a potential difference from a common transparent electrode (not shown) provided at the upper substrate by a data signal applied via the first contact hole 16. By virtue of this potential difference, a liquid crystal positioned between the thin film transistor substrate and the upper substrate is rotated by its dielectric anisotropic property and a light applied, via the pixel electrode 14, from a light source is transmitted into the upper glass substrate. A storage capacitor 18 provided between the pixel electrode 14 and the gate line 4 at the previous stage plays a role to prevent a voltage variation in the pixel electrode 14 by charging a voltage in a period at which a gate high voltage is applied to the previous-stage gate line 4 and discharging the charged voltage in a period at which a data signal is applied to the source electrode 8. The storage capacitor 18 is defined by a storage electrode 20 electrically connected, via a second contact hole 22 formed in a protective film 28, to the pixel electrode 14 and a gate electrode 4 having a gate insulating layer 26 therebetween. The storage electrode 20 is formed on the gate insulating layer 26 upon formation of the data line 2 and the source/drain electrode 8 and 12. The gate dummy pattern 30 overlaps with the data line 2 and the adjacent pixel electrode 14 to serve as a black matrix as well as to perform a repair function upon break of the data line. For instance, the gate dummy pattern 30 is electrically connected to a broken data line 2 by a laser welding technique upon break of the data line 2 to permit a repair. Also, the gate dummy pattern 30 is positioned in such a manner to overlap, by about 0.5 to 1 μm, with the data line 2 and the pixel electrode 14, thereby serving as a black matrix for shutting off a light leaked between the data line 2 and the pixel electrode 14. When the gate dummy pattern 30 is used as a black matrix as mentioned above, an area overlapping with the pixel electrode 14 can be more reduced in comparison to the conventional black matrix to expect an aperture ratio increase of about 5 to 6%. To this end, the gate pattern 30 is formed on a lower substrate 24 with having the gate insulating layer 26 at each side of the data line 2 as shown in FIG. 5. This gate dummy pattern is made from the same material (e.g., Al, Mo, Ti, W, Cr or Cu) as the gate line and the gate electrode. Such a gate dummy pattern 30 may be provided at both sides of the data line 2 or at one side of the data line 2. If the gate dummy pattern 30 is electrically connected to the gate line 4, then it can be used as a storage electrode forming the storage capacitor along with the pixel electrode 14 overlapped with having the gate insulating layer 26 and the protective film 28 therebetween. In this case, a capacitance value of the storage capacitor caused by the gate dummy pattern 30 is added to the conventional storage capacitor 18, so that a voltage of the pixel electrode 14 can be maintained at more stable state.

Figure 6:
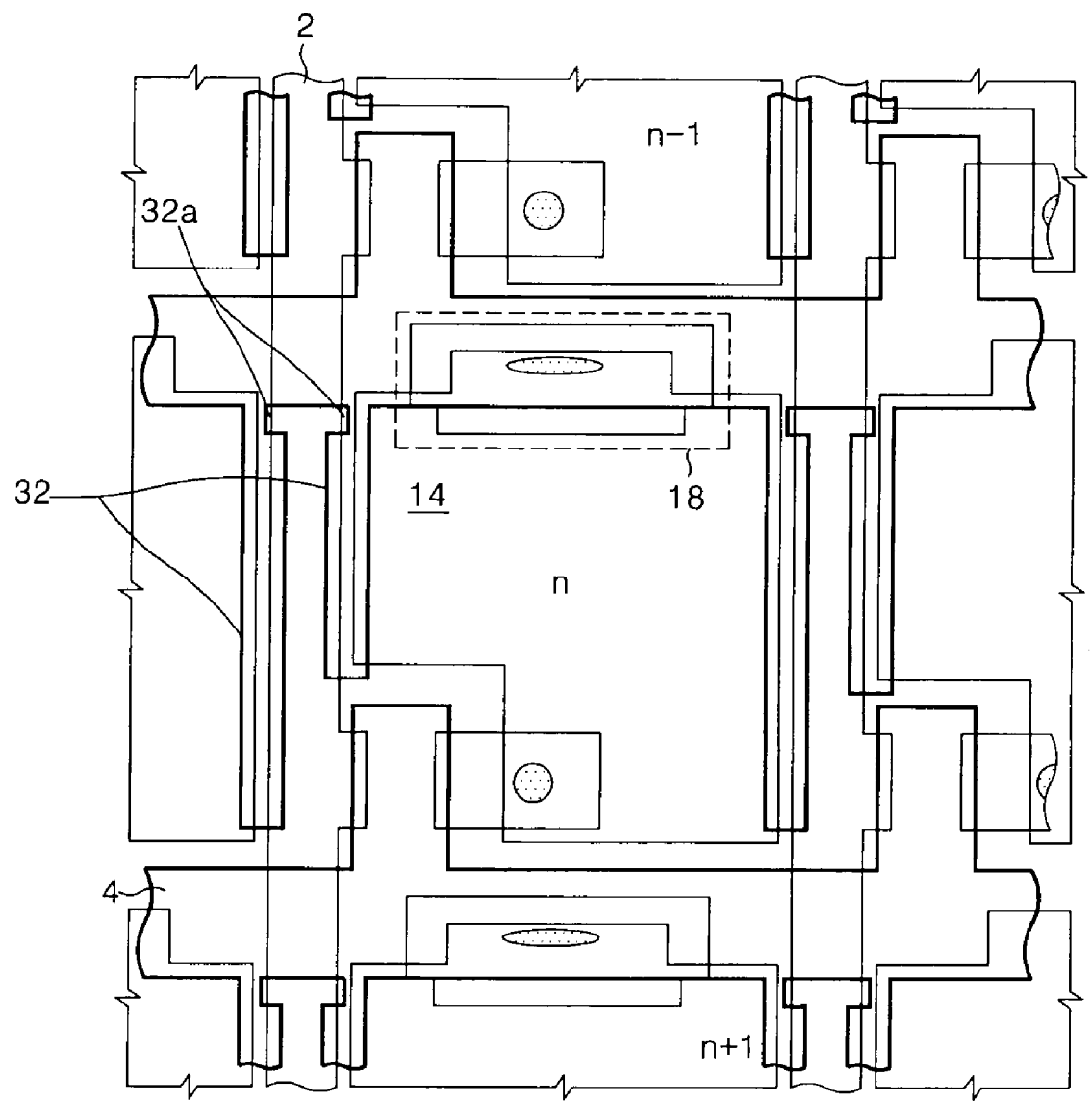
FIG. 6 is a plan view showing a structure of a thin film transistor substrate according to a second embodiment of the present invention.

FIG. 6 shows a thin film transistor substrate in a liquid crystal display (LCD) according to a second embodiment of the present invention. The thin film transistor substrate of FIG. 6 has the same elements as that of FIG. 4, except that the gate dummy pattern 32 is electrically connected to the gate line 4. The gate dummy pattern 32 is extended from the gate line 4 into a lower portion thereof so as to overlap the data line 2 and the pixel electrode 14 at each side of the data line 2. In this embodiment, the gate dummy pattern 32, along with the pixel electrode 14, defines a second storage capacitor overlapped with a gate insulating layer and a protective film. As a result, the capacitance value of the second storage capacitor caused by the gate dummy pattern 32 is added to the existing storage capacitor, that is, the first storage capacitor 18, so that the voltage at the pixel electrode 14 is more stable. In addition, the gate dummy pattern 32 allows for repairs upon breakage of the data line 2.

In order to effect repairs of the data line 2, it must be opened to the gate line 4. However, when the gate line 4 and the gate dummy pattern 32 are cut by means of a laser, the data line 2 overlapping with the gate dummy pattern 32 is also cut away. In order to prevent damage to the data line 2, a recess 32a is provided at a cutting part for breaking the gate line 4 and the gate dummy pattern 32 so as to not overlap the data line 2, as shown in FIG. 6. Accordingly, if the data line 2 breaks, repairs can be effected by cutting the recess 32a provided in the gate dummy pattern 32 using a laser to electrically separate the gate line 4 from the gate dummy pattern 32 and thereafter electrically connecting the broken data line 2 to the gate dummy pattern 32 by laser welding. The gate dummy pattern 32 is positioned so as to overlap, by about 0.5 to 1 μm, the data line 2 and the pixel electrode 14, thereby serving as a black matrix shut off a light leaking between the data line 2 and the pixel electrode 14. When the gate dummy pattern 32 is used as a black matrix as described above, the area overlapping the pixel electrode 14 can be further reduced in comparison to conventional black matrices to provide an aperture ratio increase of about 5 to 6%.

Figure 7:
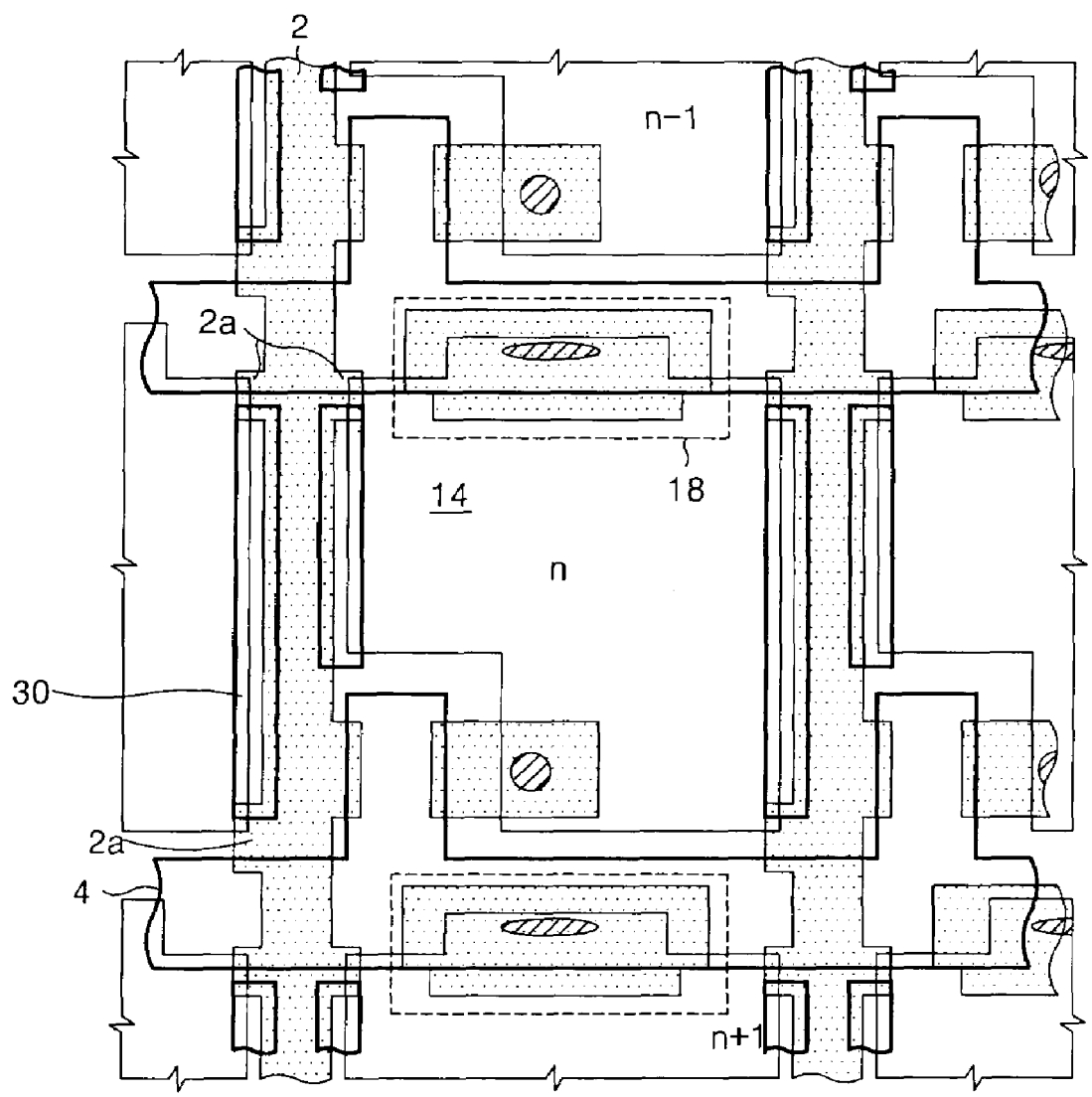
FIG. 7 is a plan view showing a structure of a thin film transistor substrate according to a third embodiment of the present invention.

Referring to FIG. 7, there is shown a thin film transistor substrate in a liquid crystal display (LCD) according to a third embodiment of the present invention. The thin film transistor substrate of FIG. 7 has the same elements as that of FIG. 4, except that a protrusion 2a is provided at the data line 2 so as to shut off any light leaking between the gate line 4 and the gate dummy pattern 30. The gate dummy pattern 30 formed at the same layer as the gate line 4 overlaps with a data line 2 and a pixel electrode 14 at each side of the data line 2 to serve as a black matrix for shutting off a light leaked between the data line 2 and the pixel electrode 14. In this case, in order to prevent a light from being leaked through a spaced area 34 between the gate line 4 and the gate dummy pattern 30, the data line 2 further includes a protrusion 2a overlapping with the gate line 4 and the gate dummy pattern 30. When the gate dummy pattern 30 and the protrusion 2a of the data line 2 are used as a black matrix as mentioned above, an area overlapping with the pixel electrode 14 can be more reduced in comparison to the conventional black matrix to provide an aperture ratio increase of about 5 to 6%. Also, the gate dummy pattern 30 permits a repair upon break of the data line 2. More specifically, the gate dummy pattern 30 is electrically connected to a broken data line 2 by the laser welding technique, etc. upon break of the data line 2 to permit a repair.

If the gate dummy pattern 30 is electrically connected to the gate line 4, then it can be used as a storage electrode forming the storage capacitor along with the pixel electrode 14 overlapped with having the gate insulating layer 26 and the protective film 28 therebetween. In this case, a capacitance value of the storage capacitor caused by the gate dummy pattern 30 is added to the conventional storage capacitor 18, so that a voltage of the pixel electrode 14 can be maintained at more stable state.

As described above, according to the present invention, the gate dummy pattern branched from the gate line and overlapping with the edge of the pixel serves as a storage electrode to increase a storage capacitance value. Accordingly, since a storage capacitance value increased by virtue of the gate dummy pattern compensates for an average maintenance voltage Vrms between the pixels generated by a characteristic difference between the thin film transistors caused by a misalignment of the line patterns in the course of a process to improve a picture quality, the present LCD is adaptive for a technique of fabricating a large-dimension LCD. Furthermore, according to the present invention, the gate dummy pattern branched from the gate line and overlapping with the edge of the pixel serves as a black matrix to further increase an aperture ratio in comparison to a case where the conventional black matrix is used. In addition, the gate dummy pattern branched from the gate line and overlapping with the edge of the pixel is used to permit a repair upon break of the data line, so that an effect of a throughput improvement can be obtain.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A thin film transistor substrate with a circuit repair feature in a liquid crystal display, the substrate comprising:
   pixel electrodes;
   data lines adjacent to each of two opposed sides of the pixel electrodes for applying data signals to the pixel electrodes via thin film transistors on the substrate;
   gate lines disposed substantially perpendicular to said data lines for applying gate signals to the thin film transistors; and
   a plurality of gate dummy patterns,
   wherein a first gate dummy pattern is located beneath only one side of a data line and running parallel to the data line and also located below only one side of a pixel electrode that is located adjacent to the one side of the data line, a second gate dummy pattern is located beneath only the other side of the data line and running parallel to the data line and also located below only one side of a pixel electrode that is located adjacent to the other side of the data line, the first and second gate dummy patterns being spaced from one another along their length, and
   wherein the gate dummy patterns are physically located separate and apart from the gate lines.

2. The thin film transistor substrate according to claim 1, wherein when a data line is broken, a gate dummy pattern is used as a redundancy electrode for electrically connecting said broken data line.

3. The thin film transistor substrate according to claim 2, wherein at least one gate dummy pattern includes a recess formed to permit a repair by disconnection of said gate dummy pattern from said gate line.

4. The thin film transistor substrate according to claim 3, further comprising:
   a protrusion protruded from at least one data line formed in such a manner as to overlap with said recess, thereby shutting off a light leaked between at least one gate dummy pattern and at least one gate line.

5. The thin film transistor substrate according to claim 3, wherein said recess is provided at a cutting part for breaking said gate dummy pattern from said gate line in such a manner that said recess is not overlapped with said broken data line.

6. The thin film transistor substrate according to claim 1, wherein at least one gate dummy pattern is used as a black matrix.

7. The thin film transistor substrate according to claim 1, further comprising:
   a storage capacitor defined by an overlapping part between at least one gate line and at least one pixel electrode.

8. The thin film transistor substrate according to claim 7, wherein an overlap portion of at least one gate dummy pattern and an edge portion of at least one pixel electrode with a gate insulating layer therebetween, forms an auxiliary storage capacitor.

9. The thin film transistor substrate according to claim 1, wherein a gate-insulating layer is formed between at least one gate dummy pattern and at least one data line.

10. The thin film transistor substrate with a circuit repair feature in a liquid crystal display of claim 1,
    wherein gate dummy patterns parallel to said data lines adjacent to each of two opposed sides of the pixel electrodes and extending substantially the entire length of the pixel electrode portions adjacent and parallel to the data lines to overlap by about 0.5-1 µm with an edge portion of said data lines and an edge portion of said pixel electrodes, to thereby serve as a black matrix to shut off light leaked between said data lines and said pixel electrodes.

11. The thin film transistor substrate according to claim 10, wherein said gate dummy patterns are formed to cover substantially all of a gap between at least one of the edge portions of said data lines and an edge portion of said pixel electrodes.

12. The thin film transistor substrate according to claim 1, wherein said gate dummy patterns are formed to cover substantially all of a gap between at least one of the edge portions of said data lines and an edge portion of said pixel electrodes.

* * * * *